United States Patent
Winker et al.

(10) Patent No.: US 6,538,712 B1
(45) Date of Patent: Mar. 25, 2003

(54) HIGH PRETILT ALIGNMENT OF REACTIVE LIQUID CRYSTALS IN LIQUID CRYSTAL DISPLAYS

(75) Inventors: Bruce K. Winker, Thousand Oaks, CA (US); Zhiming Zhuang, Thousand Oaks, CA (US)

(73) Assignee: Rockwell Science Center, LLC, Thousand Oaks, CA (US)

(*) Notice: Subject to any disclaimer, the term of this patent is extended or adjusted under 35 U.S.C. 154(b) by 0 days.

(21) Appl. No.: 09/409,005

(22) Filed: Sep. 29, 1999

(51) Int. Cl.[7] ............................................. G02F 1/3363
(52) U.S. Cl. ...................... 349/117; 349/123; 349/136; 349/183
(58) Field of Search ................................ 349/117, 118, 349/119, 120, 121, 123, 130, 132, 136, 183, 187; 359/494, 500; 428/1.2, 1.26, 1.3, 1.33; 252/299.01

(56) References Cited

U.S. PATENT DOCUMENTS 5,578,243 A * 11/1996 Mazaki et al. ......... 252/299.01
5,978,055 A * 11/1999 Van De Witte et al. .... 349/117
5,986,734 A * 11/1999 Winker et al. ............... 349/117
5,995,184 A * 11/1999 Chung et al. ................ 349/118

* cited by examiner

Primary Examiner—William L. Sikes
Assistant Examiner—Tai Duong (57) ABSTRACT

An O-plate compensator is manufactured by dissolving a polyimide polymer material incorporating a plurality of bulky side-chain groups in a first solvent to form a first solution, applying the first solution to a substrate, evaporating the first solvent to form an alignment layer, buffing the alignment layer, dissolving a polymerizable liquid crystal material in a second solvent to form a second solution, applying the second solution to the alignment layer, evaporating the second solvent to form a thin film of polymerizable liquid crystal material (with a nematic phase, an alignment-layer interface having a liquid crystal pretilt angle of between approximately 25 and 65 degrees, and an air interface), adjusting the temperature of the thin film to obtain a uniform specified orientation of a director of the thin film, and polymerizing the thin film with ultraviolet radiation to achieve a liquid crystal pretilt angle of between approximately 25 and 65 degrees at the air interface.

22 Claims, 6 Drawing Sheets

HIGH PRETILT ALIGNMENT OF REACTIVE LIQUID CRYSTALS IN LIQUID CRYSTAL DISPLAYS

CROSS REFERENCE TO RELATED APPLICATIONS

Commonly owned U.S. Pat. No. 5,504,603 "Optical Compensator for Improved Gray Scale Performance in Liquid Crystal Display" and patent application Ser. No. 947,531 "Organic O-Plate Compensator for Improved Gray Scale. Performance in Twisted Nematic Liquid Crystal Displays", filed Jul. 30, 1997, now U.S. Pat. No. 5,986,734, (continuation in part of copending patent application Ser. No. 313,531, filed Sep. 30, 1994) are hereby incorporated in their entirety by reference.

BACKGROUND OF THE INVENTION

The invention relates in general to the field of liquid crystal display design and, more particularly, to the fabrication of organic O-plate compensator elements. Specifically, the invention describes an O-plate compensator incorporating polyimide materials having bulky side-chain groups.

Liquid crystals are useful for electronic displays because polarized light traveling through a liquid crystal layer is affected by the layer's birefringence, which can be changed by the application of a voltage across the layer. By using this effect, the transmission or reflection of light from an external source can be controlled with much less power than is required for the luminescent materials used in other types of displays. As a result, liquid crystal displays (LCDs) are now commonly used in a wide variety of applications, such as, for example, digital watches, calculators, portable computers, and many other types of electronic equipment. These applications highlight some of the advantages of LCD technology including very long operational life in combination with very low weight and low power consumption.

The information content in many LCI)s is presented in the form of multiple rows of numerals or characters, which are generated by segmented electrodes deposited in a pattern on the display. The electrode segments are connected by individual leads to electronic driving circuitry. By applying a voltage to the appropriate combination of segments, the electronic driving circuitry controls the light transmitted through the segments.

Graphic and television displays may be achieved by employing a matrix of pixels in the display which are connected by an X-Y sequential addressing scheme between two sets of perpendicular conductors. More advanced addressing schemes, applied predominantly to twisted nematic LCDs, use arrays of thin film transistors to control driving voltages at individual pixels.

Contrast and stability of relative gray scale intensities are important attributes in determining the quality of a LCD. The primary factor limiting the contrast achievable in a LCD is the amount of light which leaks through the display in the dark state. In addition, the contrast ratio of the LCD also depends on the user's viewing angle. The contrast ratio in a typical LCD is a maximum only within a narrow viewing angle centered near normal incidence and drops off as the angle of view is increased. This loss of contrast ratio is caused by light leaking through the black state pixel elements at large viewing angles. In color LCDs, such leakage can also cause severe color shifts for both saturated and gray scale colors.

The viewing zone of acceptable gray scale stability in a typical prior art twisted nematic LCD is severely limited because, in addition to color shifts caused by dark state leakage, the optical anisotropy of the liquid crystal molecules results in large variations in gray level transmission as a function of viewing angle. The variation is often severe enough that, at extreme vertical angles, some of the gray levels reverse their transmission levels. These limitations are particularly important for applications requiring a very high quality display, such as in avionics, where viewing of cockpit displays from both pilot and copilot seating positions is important. Such high information content displays require that the relative gray level transmission be as invariant as possible with respect to viewing angle. It would be a significant improvement in the art to provide a liquid crystal display capable of presenting a high quality, high contrast image over a wide field of view.

Figure 1A:
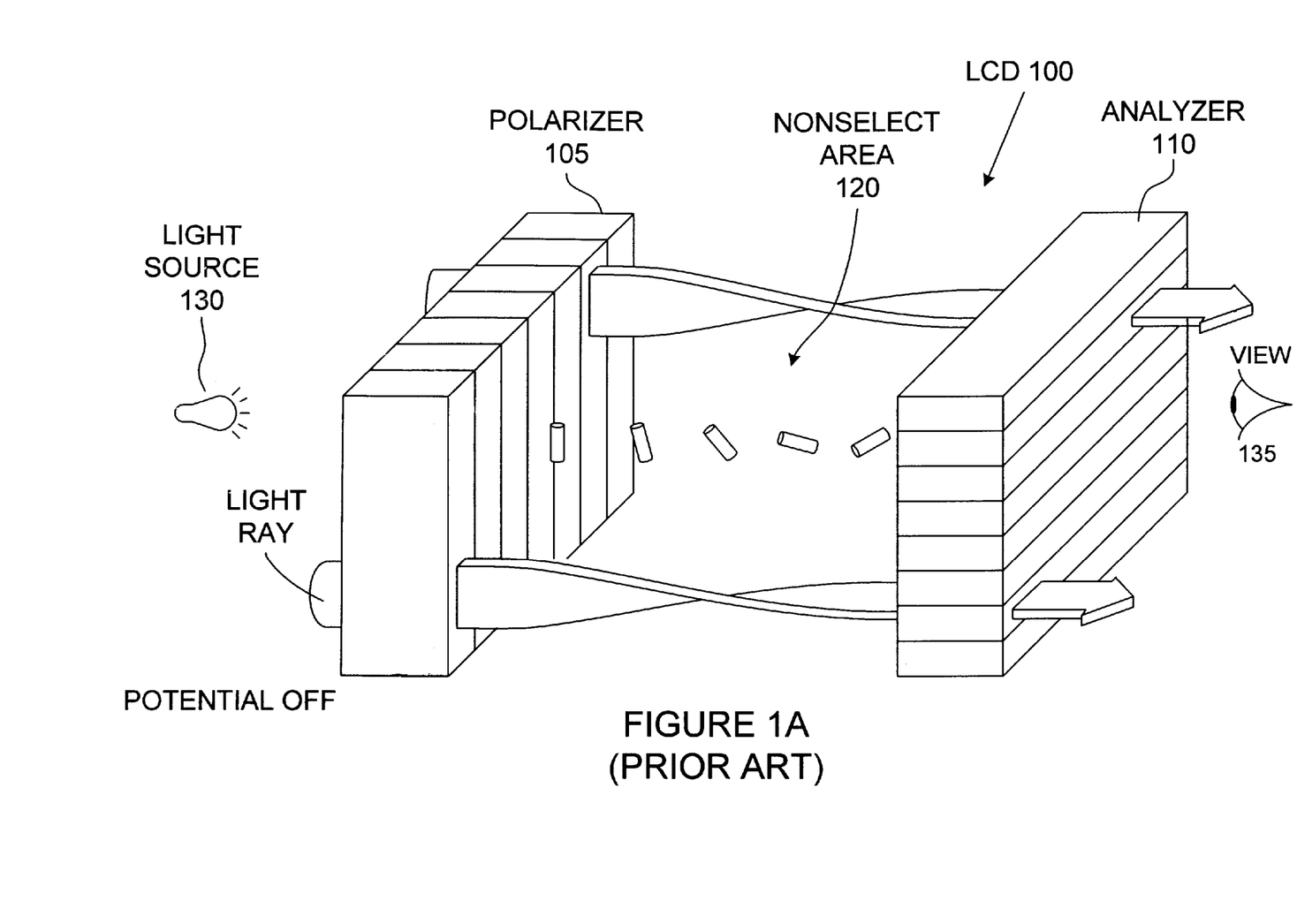
FIGS. 1A–B show, in overview, the operation of a normally white, 90° twisted nematic liquid crystal display.
Figure 1B:
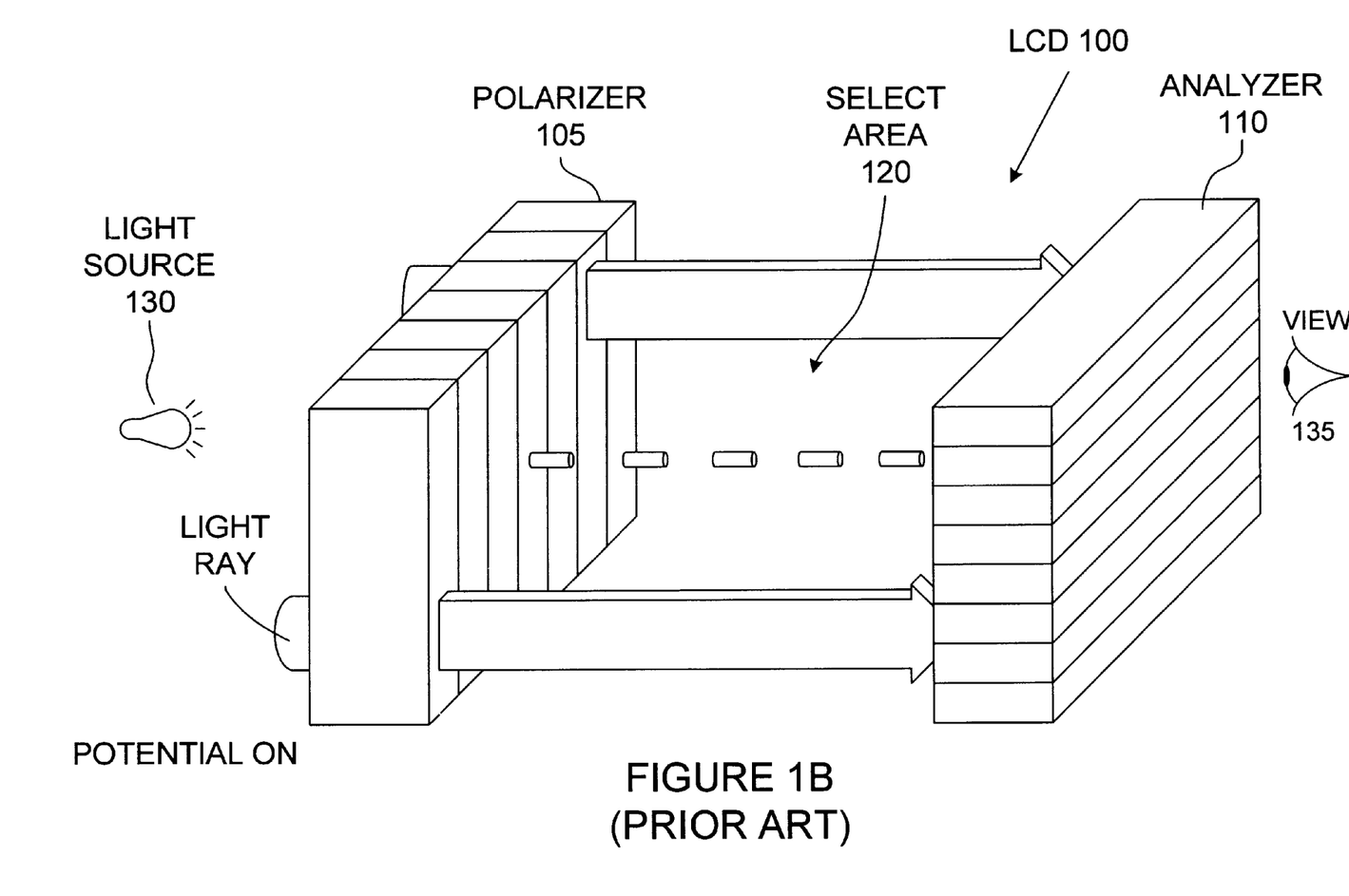

FIGS. 1A and 1B show a conventional normally white, twisted nematic LCD 100 including a polarizer 105, an analyzer 110 with a polarization axis perpendicular to that of the polarizer 105, a light source 130, and a viewer 135. (The polarizer 105 and the analyzer 110 both polarize electromagnetic fields. Typically, however, the term 'polarizer' refers to a polarizer element that is closest to the source of light while the term 'analyzer' refers to a polarizer element that is closest to the viewer of the LCD.) In the normally white configuration of FIGS. 1A and 1B, a "nonselect" area 115 (no applied voltage) appears light, while a "select" area 120 (those which are energized by an applied voltage) appear dark. In the select area 120 the liquid crystal molecules tend to tilt and rotate toward alignment with the applied electric field. If this alignment were perfect, all the liquid crystal molecules in the cell would be oriented with their long axes normal to the cell's major surface. This configuration is known as homeotropic alignment.

Because the liquid crystals used for twisted nematic displays exhibit positive birefringence, this arrangement, known as the homeotropic configuration, would exhibit the optical symmetry of a positively birefringent C-plate. As is well known in the art, a C-plate is a uniaxial birefringent compensator with its extraordinary axis (i.e., its optic or c-axis) perpendicular to the surface of the plate (parallel to the direction of normally incident light). In the select state the liquid crystal in a normally white display would thus appear isotropic to normally incident light, which would be blocked by the crossed polarizers.

One reason for the loss of contrast with increased viewing angle which occurs in a normally white display is that a homeotropic liquid crystal layer will not appear isotropic to off-normal light. Light propagating through the liquid crystal layer at off-normal angles appears in two modes due to the birefringence of the layer; a phase delay is introduced between those modes and increases with the incident angle of the light. This phase dependence on angle of incidence introduces an ellipticity to the polarization state which is incompletely extinguished by the second polarizer, giving rise to light leakage. To correct for this effect, an optical compensating element must also have C-plate symmetry, but with negative birefringence ($n_e < n_o$). Such a compensator will introduce a phase delay opposite in sign to the phase delay caused by the liquid crystal layer, thereby restoring the original polarization state and allowing light passing through energized areas of the layer to be blocked more completely by the output polarizer. C-plate compensation, in general, does not impact the variation of gray scale with viewing angle which is addressed by the present invention.

Figure 2:
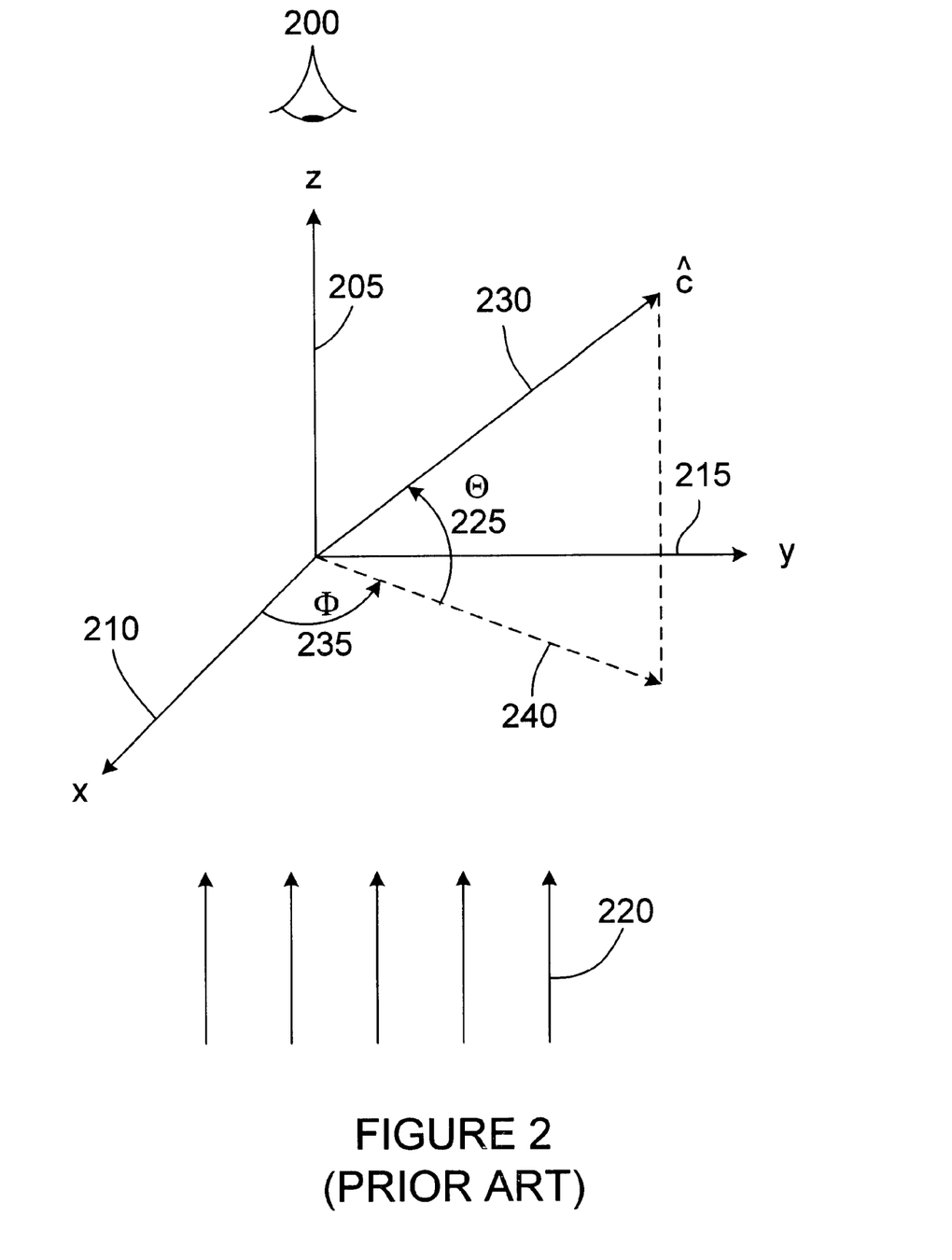
FIG. 2 depicts the coordinate system that is used to specify component orientations in the description of this invention.

FIG. 2 depicts the coordinate system which is used to describe the orientation of both liquid crystal and birefringent compensator optic axes. Light propagates toward the viewer 200 in the positive z direction 205 which, together with the x-axis 210 and the y-axis 215, form a right-handed coordinate system. Backlighting is provided, as indicated by arrows 220. The polar tilt angle θ 225, also referred to as a pretilt angle, is defined as the angle between the liquid crystal's molecular optic axis ĉ 230 and the x-y plane, as measured from the x-y plane. The azimuthal or twist angle φ 235 is measured from the x-axis to the projection 240 of the optic axis onto the x-y plane.

Normally White Twisted Nematic LCDs

Figure 3:
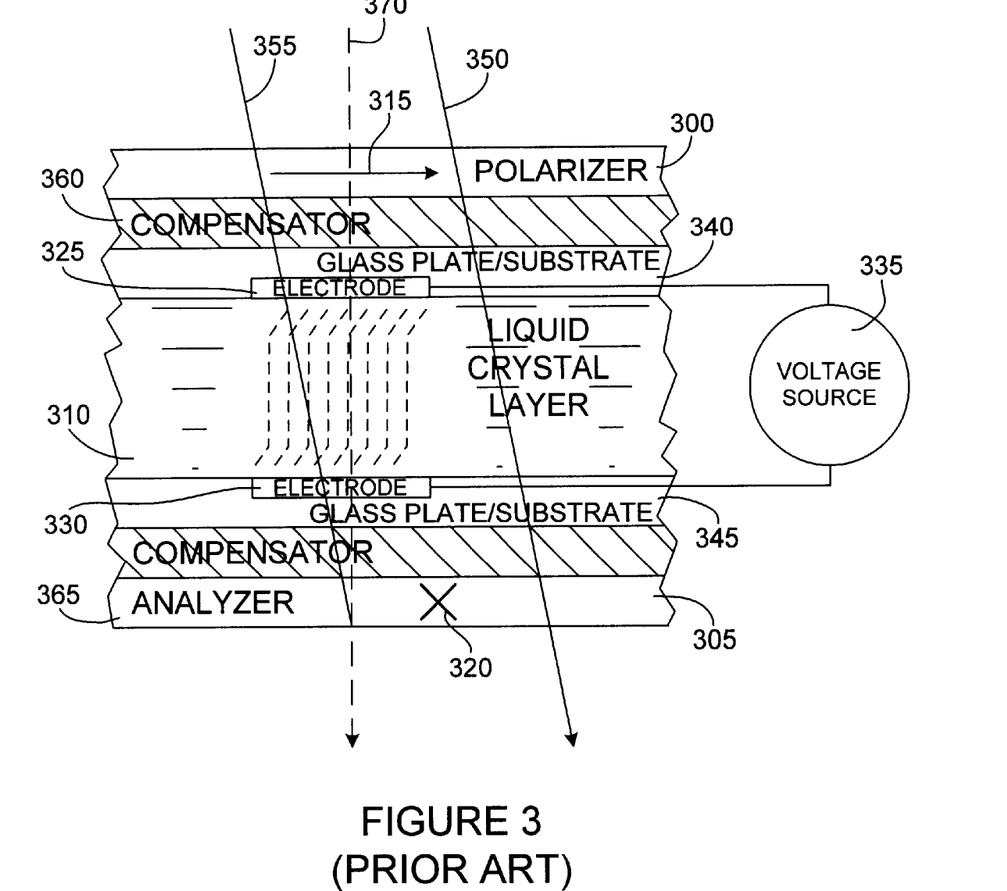
FIG. 3 is a cross sectional schematic view of a 90° twisted nematic, transmissive type normally white liquid crystal display.

FIG. 3 is a cross sectional schematic view of a prior art twisted nematic, transmissive type. normally white liquid crystal display. The display includes a polarizer layer 300 and an analyzer layer 305, between which is positioned a liquid crystal layer 310, consisting of a liquid crystal material in the nematic phase.

It is convenient in describing the orientation of various compensation elements of the display to refer to a normal axis perpendicular to the display, which is depicted by a dashed line 370. In the case of a normally white LCD, the polarizer 300 (with a polarization direction in the plane of the drawing 315) and the analyzer 305 (with a polarization direction 320 perpendicular to the plane of the drawing) are oriented with their polarization directions at 90° to one another. A first transparent electrode 325 and a second transparent electrode 330 are positioned on the glass plates 340 and 345 adjacent to opposite surfaces of the liquid crystal layer 310 so that a voltage can be applied, by means of a voltage source 335, across the liquid crystal layer. As is explained below, the inner surfaces of the glass plates 340 and 345, which are proximate to the liquid crystal layer 310, can be physically or chemically treated to affect the desired liquid crystal orientation, as by buffing.

As is well known in the LCD art (see, e.g., Kahn, "The Molecular Physics of Liquid Crystal Devices," Physics Today, pp. 66–74, May 1982), when the inner surfaces of the plates 340 and 345 (the surfaces adjacent to the liquid crystal layer 310) are coated with a surface treatment for aligning the liquid crystal, such as a polyimide, buffed, and oriented with their buffed directions perpendicular, the director of the liquid crystal material, absent any applied electrical voltage, will tend to align with the buffed direction (known as the "rub direction") in the regions of the layer 310 proximate each of the plates 340 and 345. Furthermore, the orientation of the liquid crystal axis (i.e., the director) will twist smoothly with respect to the normal axis through an angle of approximately 90° along a path in the layer 310 from a first major surface adjacent to the plate 340 (i.e., at the 310/340 interface) to a second major surface adjacent to the plate 345 (i.e., at the 310/345 interface).

In the absence of an applied electric field the direction of incoming polarized light will be rotated by 90° in traveling through the liquid crystal layer 310. When the glass plates and the liquid crystal layer are placed between crossed polarizers, such as the polarizer 300 and the analyzer 305, light polarized by the polarizer and traversing the display, as exemplified by the light ray 350, will thus be aligned with the polarization direction of the analyzer 320 and therefore will pass through the analyzer.

When a sufficient voltage is applied to the electrodes 325 and 330, however, the applied electric field causes the director of the liquid crystal material to tend to align parallel to the field. With the liquid crystal material in this state, light passed by the polarizer 300, as illustrated by the light ray 355, will be extinguished by the analyzer 305. Thus, an energized pair of electrodes will produce a dark region in the display, while light passing through regions of the display which are not subject to an applied field will produce illuminated regions. As is well known in the art, an appropriate pattern of electrodes, activated in selected combinations, can be utilized in this manner to display alphanumeric or graphic information. As explained further below, one or more compensator layers, such as the layers 360 and 365, may be included in the display to improve the quality of the display.

O-Plate Gray Scale Compensation

To substantially eliminate reversal of gray levels and improve gray scale stability, a birefringent O-plate compensator can be used. The O-plate compensator, as described in U.S. Pat. No. 5,504,603, utilizes a positive birefringent material with its principal optic axis oriented at a substantially oblique angle with respect to the plane of the display (hence the term "O-plate"). "Substantially oblique" implies an angle appreciably greater than 25° and less than 65°. O-plates have been utilized, for example, with angles relative to the plane of the display between 30° and 60°, typically at 45°. Moreover, O-plates with either uniaxial or biaxial materials can be used. O-plate compensators can be placed in a variety of locations between a LCD's polarizer layer and analyzer layer.

In general, compensation schemes using O-plate compensators may also include A-plates and/or negative C-plates. As is well known in the art, an A-plate is a birefringent layer with its extraordinary axis (i.e., its c-axis) oriented parallel to the surface of the layer. Its a-axis is thus oriented normal to the surface (parallel to the direction of normally incident light), leading to its designation as an A-plate. A-plates may be fabricated by the use of uniaxially stretched polymer films, such as polyvinyl alcohol, or other suitably oriented organic birefringent materials.

A C-plate is a uniaxial birefringent layer with its extraordinary axis oriented perpendicular to the surface of the layer (parallel to the direction of normally incident light). Negatively birefringent C-plates may be fabricated by the use of uniaxially compressed polymers (See, e.g., Clerc et al., U.S. Pat. No. 4,701,028), stretched polymer films, or by the use of physical vapor deposited inorganic thin films (See, e.g., Yeh et al., U.S. Pat. No. 5,196,953).

Oblique deposition of a thin film by physical vapor deposition is known to produce a film having birefringent properties (see, e.g., Motohiro and Taga, "Thin Film Retardation Plate by Oblique Deposition," Appl. Opt.,. Vol. 28, No. 3, pp. 2466–2482, 1989). By further exploiting the tilted orientation of the symmetry axis, the Motohiro process can be refined or enhanced to fabricate O-plates. Such components are by their nature biaxial. Their growth characteristics generate a microscopic columnar structure. The angles of the columns are tipped toward the direction of the arrival of a vapor stream. A deposition angle (measured from normal) of 76°, for example, results in a column angle of approximately 45°. The columns develop an elliptical cross section as the result of shadowing. This elliptical cross section gives rise to the biaxial character of the films. The birefringence, in magnitude and symmetry, is entirely attributable to the film microstructure and is referred to as form birefringence. These phenomena in thin films have been extensively studied and described by Macleod ("Structure-Related Optical Properties of Thin Films," J. Vac. Sci. Technol. A, Vol. 4, No. 3, pp. 418–422, 1986).

Uniaxial O-plate components can also be used to improve gray scale stability in twisted nematic liquid crystal displays. These may be fabricated by the use of suitably oriented organic birefringent materials. Those skilled in the art will recognize other means for fabricating both uniaxial and biaxial O-plates.

Elimination of gray scale reversal by the use of an O-plate compensator layer occurs in the following manner. In the positive vertical viewing direction, the retardation of the O-plate increases with viewing angle and tends to offset the decreasing retardation of the liquid crystal layer. When the viewer is looking down the axis of the average liquid crystal director, the presence of the O-plate prevents the layers between the two polarizers from appearing isotropic.

In the negative vertical viewing direction, the combination of an O-plate and an A-plate with their optic axes nominally at right angles tends to exhibit birefringence characteristics similar to that of a negative birefringence retarder with its optic axis oriented perpendicular to the plane containing the axes of the O-plate and A-plated. The direction of this retarder axis is nominally parallel to the orientation of the average liquid crystal in the central region of the cell when it is driven at a voltage between select and non-select states. Thus, the presence of an O-plate oriented in this manner tends to cancel the birefringence of the liquid crystal layer. A similar effect occurs in the positive and negative horizontal viewing directions.

The orientations of a compensator's optic axes can be carefully chosen so that the combined retardation effects cancel each other in the normal incidence viewing direction as well as improving viewing in the horizontal direction. Combinations of more than one O-plate can be used as long as their orientations satisfy these requirements. Furthermore, negative C-plates can, for certain configurations, increase the contrast ratio at large fields of view, occasionally with some decrease in gray scale stability.

O-Plate Technology

The liquid crystal layer, the compensator layer(s), the polarizer layer, and the analyzer layer may assume a variety of orientations relative to one another in a liquid crystal display. Some of the possible configurations are shown in Table 1, where 'A' represents an A-plate, 'C' represents a C-plate, 'O' represents an O-plate, 'LC' represents the liquid crystal, and 'OxO' represents crossed O-plates. Crossed O-plates are adjacent O-plates with their azimuthal angles φ 235 nominally crossed, one oriented between 0° and 90° and the second oriented between 90° and 180°.

TABLE 1

Liquid Crystal Display Elements

| ← Toward Rear (Polarized Side) | | | | Toward Front (Analyzer Side) → | | |
|---|---|---|---|---|---|---|
|   |   | O   | A  | LC |     |   |
|   |   | A   | O  | LC |     |   |
|   |   |     | O  | LC | O   | A |
|   | A | O   | A  | LC |     |   |
|   |   | O   | A  | LC | A   |   |
|   | O | A   | C  | LC |     |   |
|   |   | OxO | A  | LC |     |   |
|   | A | OxO | A  | LC |     |   |
|   |   |     | A  | LC | OxO | A |
| A | O | A   | C  | LC |     |   |
|   | A | O   |    | LC | O   | A |
|   | A | O   | C  | LC | C   | O |
|   | A | O   | C  | LC | C   | O | A |
| C | A | O   |    | LC | O   | A | C |

The projections of the principal axes onto the plane of the display with respect to the liquid crystal director orientation can vary with the embodiment. In some cases, for example with two O-plates, the O-plate axis projections are at approximately 45° with respect to the average liquid crystal director orientation near the center of the liquid crystal cell, while in others, the O plate axis projection is substantially parallel to that of the liquid crystal director.

Crossed O-plate (OxO) designs that are further compensated with A-plates provide additional design flexibility. The choice of A-plate value is not critical as such designs can be adjusted by varying the relative orientations of the A-plates. Thus, it is possible to generate desired solutions with commercially available A-plate retardation values.

The flexibility which an O-plate compensation scheme offers the display designer allows tailoring of performance to specific display product requirements. It is possible, for example, with a simple configuration and parameter modifications to achieve an isocontrast optimized for left or right viewing, an isocontrast optimized for extreme vertical angle viewing, or an isocontrast optimized for viewing at both large left and right angles above normal viewing. It is also possible to adjust the configuration and parameters to improve both the contrast and gray scale stability over a specified field of view, or to further optimize one at the expense of the other.

BACKGROUND SUMMARY

When viewed at an angle near the normal to its surface, a twisted nematic liquid crystal display provides high quality output. At large viewing angles, however, the image tends to degrade and exhibit poor contrast and gray scale uniformity. This occurs because the phase retardation effect of the liquid crystal material on light passing through it inherently varies with the inclination angle of the light, leading to a lower quality image at large viewing angles. By introducing one or more optical compensating elements in conjunction with the liquid crystal cell, it is possible to substantially correct for the undesirable angular effects and thereby maintain higher contrast and stable relative gray scale intensities at larger viewing angles than otherwise possible.

A liquid crystal display using a positively birefringent O-plate compensator is described herein that makes possible a significant improvement in the gray scale properties and contrast ratios of liquid crystal displays over a wide range of viewing angles. Further, the described method can reduce the cost of manufacturing an O-plate compensator by reducing the number of thin film layers typically used in its construction.

SUMMARY OF THE INVENTION

An O-plate compensator (oblique retarder) comprising a polymerized reactive liquid crystal thin film and a rubbed polymer alignment layer incorporating a polyimide having bulky side-chain groups (i.e., sterically hindered side-chain groups) is described. The alignment layer is produced by solvent casting a thin film of polyimide material containing bulky side-chains onto a substrate. The polyimide surface is then mechanically buffed as in conventional processing of liquid crystal displays. Next, a thin film of reactive liquid crystal material is deposited onto the polyimide alignment layer using a solvent casting technique. The buffed polyimide surface aligns the adjacent reactive liquid crystal molecules with a solid/nematic pretilt angle of between approximately 25° and approximately 65°. Finally, the solvent is evaporated and the reactive liquid crystal film is photopolymerized (with ultraviolet light) so as to freeze in the film's nematic order. In an alternative embodiment, the liquid crystal thin film incorporates a side-chain liquid crystal polymer. The large, uniform, pretilt angles achievable with the method are relatively insensitive to normal variations in processing conditions such as alignment layer rubbing strength, solvent exposure and drying temperature, polymerization temperature and the like.

DESCRIPTION OF THE INVENTION

Illustrative embodiments of the invention are described below as it might be implemented using solvent casting techniques to deposit obliquely oriented (e.g., O-plate) compensator elements on a glass or plastic substrate of a liquid crystal display's liquid crystal cell. In the interest of clarity, not all features of an actual implementation are described in this specification. It will of course be appreciated that in the development of any such actual implementation, numerous implementation-specific decisions must be made to achieve a developers' specific goals such as compliance with system-related and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

In the following, the expression "bulky side-chain groups" refers to sterically hindered side-chain groups. Examples of these types of compounds include, but are not limited to saturated alkyl chains comprising up to 18 carbon atoms and trifluoromethylphenyl groups.

Figure 4:
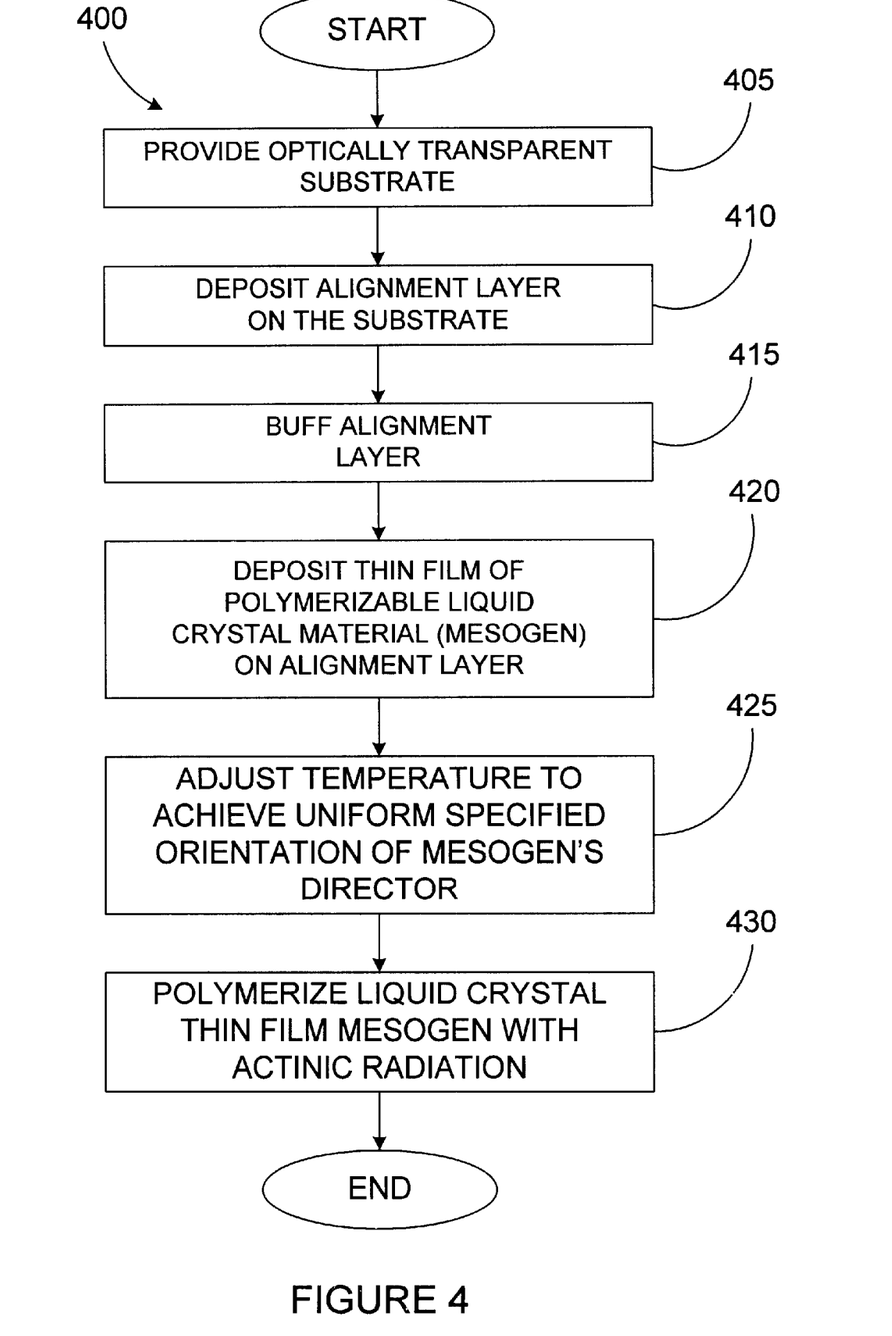
FIG. 4 is a high-level flow chart showing one exemplar process for fabricating an O-plate compensator in accordance with the invention.

Fabrication of an O-Plate Compensator Incorporating Polyimide Materials Containing Bulky Side-Chain Groups FIG. 4 is a high-level flow chart 400 showing one exemplar process for fabricating an O-plate compensator in accordance with the invention. Block numbers below refer to enumerated elements (blocks) in FIG. 4.

405: Provide an optically transparent substrate. Typically the substrate can be either glass or plastic and may be one of the plates that form the display's liquid crystal cell. Typical glass substrates are comprised of silicate or soda lime glass, with approximate thickness of 0.5 to 1.1 millimeters (mm). Typical plastic substrates can vary in thickness from approximately 50 to 200 micrometers ($\mu$m). Further, plastic substrates may be comprised of any suitable polymer material such as poly(ethylene terephthalate).

410: Deposit a liquid crystal alignment layer, consisting of a polyimide polymer material incorporating a plurality of bulky side-chain groups, onto the substrate. In a preferred embodiment, a polyimide polymer material available from Japan Synthetic Rubber, product numbers JALS246, JALS212, and JALS214, is used. (It is noted that polyimides are a well-known class of polymers that exhibit good thermal and mechanical properties vis a vis liquid crystal displays.)

In the current context, the term "deposit" encompasses any convenient deposition technique in which a layer is formed in-place and is intended to distinguish from other techniques such as lamination, in which a pre-formed layer is bonded to a substrate. Specifically, the term "deposit" is not intended to be limited to depositing a material directly onto the substrate, but instead to encompass situations in which the material is deposited onto one or more intermediate layers which are on the substrate.

In a preferred embodiment, the alignment layer is solvent cast onto the substrate. In this well-known process, the alignment layer material is first dissolved by a solvent to form a solution, a thin film of which is then applied to the surface of the substrate. When the solvent is evaporated off, what remains is a thin film alignment layer. For example, an alignment layer of JALS246 may be applied at room temperature and baked at a temperature of between 100° C. and 200° C. for 5 to 60 minutes to remove the solvent to produce an alignment layer of approximately 0.1 to 0.3 $\mu$m in thickness.

Commercially available solvents include aromatic hydrocarbons such as toluene and monochlorobenzene, ketones such as methylethylketone and cyclohexanone, and esters such as perhaps propyleneglycolmonomethyletheracetate (PGMEA). Some techniques which are compatible with the inventive method include spin-coating, Meier-rod or doctor-bar coating, and meniscus coating.

415: Buff the alignment layer. As would be known to one of ordinary skill in the art, buffing or rubbing of the alignment layer induces a pretilt angle $\theta$ 225 into the surface molecules of the alignment layer (i.e., that surface which is away from the underlying substrate).

In one embodiment, a buffing cloth is comprised of a rayon pile approximately 1.8 mm in length, which is attached to the outer surface of a 4 inch diameter aluminum cylinder rotating at a speed of approximately 200 to 1,000 revolutions-per-minute. As it rotates, the cylinder moves horizontally across the surface of the alignment layer at a speed of approximately 0.5 to 5.0 centimeters-per-second. The height of the aluminum cylinder above the alignment layer surface is adjusted so that the pile touches the surface of the alignment layer and is deflected by the alignment layer a distance of approximately 0.2 to 0.6 mm. These buffing conditions are known in the art to produce a high rubbing strength treatment which results in a pretilt angle $\theta$ which is relatively insensitive to minor changes in buffing conditions.

It is noted that use of conventional polymer alignment layer materials (i.e., those not containing alkyl side-chain groups) typically achieve pretilt angles $\theta$ of below 20° when used in conjunction with either conventional (i.e., non-polymerizable) or polymerizable liquid crystal material for the layer formed in operation 420.

420: Deposit a thin film of polymerizable liquid crystal material onto the alignment layer. For subsequent operations, it is necessary that the liquid crystal material contains a photoinitiator such as, for example, approximately 0.5% of Irgacure 651 (available from Ciba-Geigy). (That surface of the thin film liquid crystal immediately adjacent to the underlying alignment layer is referred to as the alignment-layer interface. That surface of the liquid crystal thin film exposed to the air is referred to as its air interface.) Possible polymerizable liquid crystal materials having a nematic phase suitable for use in the inventive method include acrylates, epoxides, and vinyl ethers. The chemical structure of the polymerizable liquid crystal material is selected so that it has an intrinsic pretilt angle $\theta$ at its air interface of between 25° and 65° when it is in its nematic phase.

In one illustrative embodiment, the polymerizable liquid crystal material RM82 (available from E.M. Industries) is solvent cast onto the alignment layer (using monochlorobenzene as solvent) in such a manner that a thin film layer of RM82 of approximately 0.3 μm is constructed.

It is known that incorporation of bulky side-chain groups into the alignment layer material typically produces pretilt angles for conventional (i.e., non-polymerizable) liquid crystal material of less than 20°. In contradistinction to these prior art techniques, the invention incorporates bulky side-chain groups into the alignment layer, in combination with the use of a polymerizable liquid crystal material to advantageously produce pretilt angles for the polymerizable liquid crystal layer of between approximately 25° and approximately 65°.

In summary, the combination of alignment layer material containing bulky side-chain groups buffed under high rubbing strength conditions 415, and polymerizable liquid crystal material 420 achieves reproducible pretilt angles θ in excess of 20°.

425: Adjust the temperature of the thin film liquid crystal material to achieve a uniform specified orientation of the liquid crystal's director, e.g., the angle that is exhibited by the alignment layer's pretilt angle is approximately equal to the liquid crystal's alignment layer pretilt angle. In one embodiment, the liquid crystal film of operation 420 is heated to approximately 90° C. for approximately 30 seconds to 5 minutes depending upon the specific solvent used. Those of ordinary skill in the field will recognize that the specific temperature and time required for this operation is dependent, among other factors, on the liquid crystal material used in operation 420, its thickness, and the desired pretilt angle θ. In practice, the temperature range for this operation can, therefore, range from room temperature (roughly 28° C.) to approximately 100° C.

430: Polymerize the liquid crystal thin film by illuminating it with actinic radiation. For example, the liquid crystal film of operation 425 would be illuminated with ultraviolet light at a wavelength of 360 nanometers (nm) and approximately 10 milliwatts-per-cm$^2$ intensity for approximately 5 minutes. As would be known to those of ordinary skill in the art, the concentration of photoinitiator, the wavelength of ultraviolet light, and the duration of exposure are interdependent and subject to modification—the goal being to achieve a high degree of conversion (greater than 80%) of the reactive liquid crystal material.

Figure 5:
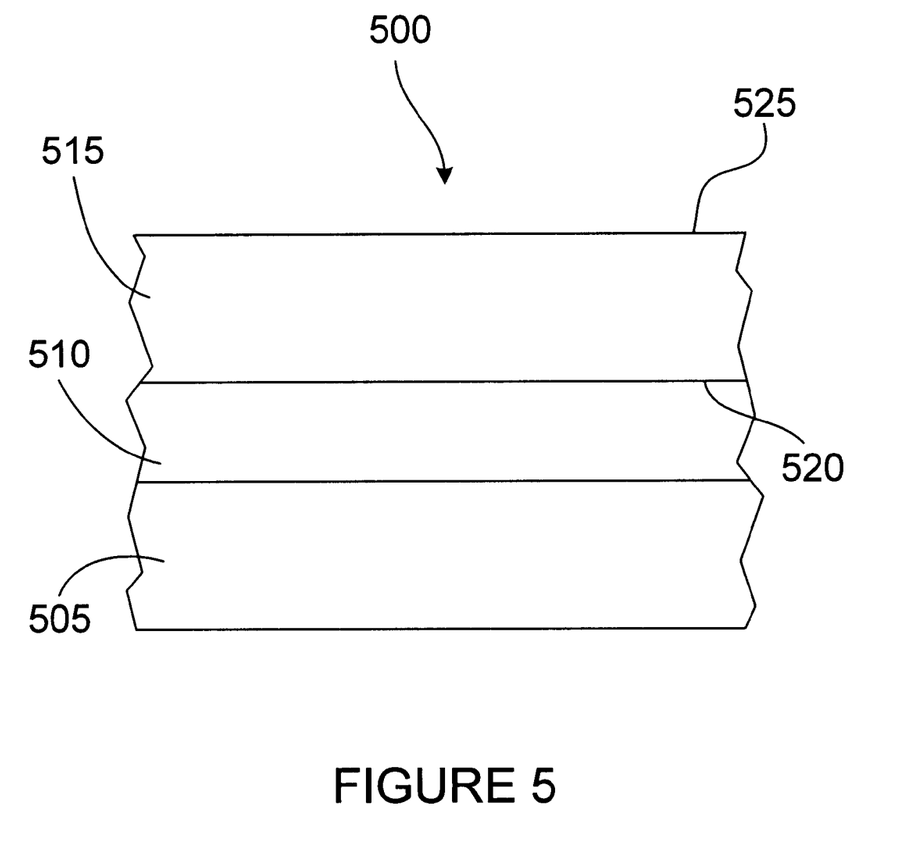
FIG. 5 is a block diagram of an O-plate compensator in accordance with the method of FIG. 4.

A block diagram of an O-plate compensator 500 made in accordance with the inventive operations 400 through 430 in shown in FIG. 5. An optically transparent substrate 505 has deposited on it a liquid crystal alignment layer 510. In accordance with operation 410, the alignment layer comprises a polyimide polymer material incorporating a plurality of bulky side-chain groups. After buffing in accordance with operation 415, a thin film of polymerizable liquid crystal material 515 is deposited onto the alignment layer. (See operation 420.) That surface of the liquid crystal thin film immediately adjacent to the underlying alignment layer is referred to as the alignment-layer interface 520. That surface of the thin film liquid crystal material exposed to the air is referred to as its air interface 525.

An O-plate compensator 500 fabricated in accordance with operations 405 through 430 exhibits large pretilt angle θ of between approximately 25° and approximately 65° at both its alignment-layer interface 520 and its air interface 525. Further, these large pretilt angles are relatively insensitive to normal variations in processing conditions such as alignment layer rubbing strength, solvent choice, drying temperature, polymerization temperature and the like. (Large uniform pretilt angles at both the alignment-layer and air interfaces are difficult, and/or expensive, to achieve using conventional fabrication techniques.)

Large, reproducible pretilt angles allow the fabrication of effective O-plate (oblique) compensators. Oblique compensators, in turn, can enhance a liquid crystal display's performance by enlarging its intrinsic viewing angle and improving its contrast and grayscale characteristics.

An Alternative Embodiment

In an alternative embodiment, the liquid crystal alignment layer of operation 410 may be a conventional alignment layer material (i.e., does not contain the bulky side-chain groups discussed above), while the thin film liquid crystal material of 420 has incorporated therein a bulky side-chain liquid crystal polymer. In other aspects, the method of 405 through 430 are the same.

A bulky side-chain liquid crystal polymer that has been found to provide satisfactory results is LCP92 (available from E.M. Industries), in combination with a liquid crystal material RM82, and a conventional alignment layer material manufactured by Japan Synthetic Rubber, part number AL3046. The concentration of LCP92 relative to RM82 ranges from about 1% to about 15%. In this embodiment, the liquid crystal material's pretilt angle θ at the alignment-layer interface increased by about 10° over that obtainable by conventional fabrication techniques (e.g., those not using a side-chain liquid crystal polymer).

The inventive method allows reproducible high pretilt angles θ using conventional liquid crystal display manufacturing equipment without the need for additional process steps such as the deposition of an intermediate polymerizable layer between the alignment layer and the O-plate layer as taught in the previously cited U.S. patent application Ser. No. 08/313,531. The elimination of extra process steps reduces fabrication costs for an O-plate compensator.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more, indicative of the full scope of the invention.

What is claimed is:

1. A method of manufacturing an O-plate compensator, comprising the steps of:

providing a substrate;

dissolving a polyimide polymer material incorporating a plurality of bulky side-chain groups in a first solvent to form a first solution;

applying said first solution to said substrate;

evaporating said first solvent to form an alignment layer;

buffing said alignment layer;

dissolving a polymerizable liquid crystal material in a second solvent to form a second solution;

applying said second solution to said alignment layer;

evaporating said second solvent to form a thin film of polymerizable liquid crystal material having
 a nematic phase,
 an alignment-layer interface having a liquid crystal pretilt angle of between approximately 25 degrees and approximately 65 degrees, and
 an air interface;

adjusting the temperature of said thin film of polymerizable liquid crystal material to obtain a uniform specified orientation of a director of said thin film of polymerizable liquid crystal material; and polymerizing said thin film of polymerizable liquid crystal material with ultraviolet radiation to achieve a liquid crystal pretilt angle of between approximately 25 degrees and approximately 65 degrees at said air interface.

2. A method of manufacturing an O-plate compensator, comprising:

providing a substrate;

applying an alignment layer to said substrate, wherein said alignment layer comprises a thin film of a polymer material incorporating a plurality of bulky side-chain groups;

buffing said alignment layer;

applying a thin film of a polymerizable liquid crystal material to said alignment layer;

adjusting the temperature of said thin film of polymerizable liquid crystal material to obtain a uniform specified orientation of a director of said thin film of polymerizable liquid crystal material; and polymerizing said thin film of polymerizable liquid crystal material with actinic radiation.

3. The method of claim 2, wherein the step of applying an alignment layer comprises solvent casting said alignment layer onto said substrate.

4. The method of claim 2, wherein the step of applying a thin film of a polymerizable liquid crystal material comprises solvent casting said polymerizable liquid crystal material onto said alignment layer.

5. The method of claim 2, wherein said thin film of polymerizable liquid crystal material has a nematic phase, an alignment-layer interface that provides a substantially oblique pretilt liquid crystal orientation angle, and an air interface, such that the step of adjusting the temperature of said thin film of polymerizable liquid crystal material is performed to achieve a liquid crystal pretilt angle at said air interface that is substantially the same as the liquid crystal pretilt angle at said alignment-layer interface.

6. The method of claim 2, wherein at least some of said plurality of bulky side-chain groups incorporate between 12 and 18 saturated carbon atoms.

7. The method of claim 2, wherein at least some of said plurality of bulky side-chain groups incorporate trifluoromethyl groups.

8. The method of claim 2, wherein said alignment layer is a polyimide material.

9. The method of claim 5, wherein said polymerizable liquid crystal material has a liquid crystal pretilt angle of approximately 25 degrees to approximately 65 degrees.

10. A method of manufacturing an O-plate compensator comprising:

providing a substrate;

applying an alignment layer to said substrate, wherein said alignment layer comprises a thin film of a polymer material;

buffing said alignment layer;

applying a thin film of a polymerizable liquid crystal material to said alignment layer, said polymerizable liquid crystal material incorporating a bulky side-chain liquid crystal polymer;

adjusting the temperature of said thin film of polymerizable liquid crystal material to obtain a uniform specified orientation of a director of said thin film of polymerizable liquid crystal material; and polymerizing said thin film of polymerizable liquid crystal material with actinic radiation.

11. The method of claim 10, wherein said side-chain liquid crystal polymer is a polyacrylate.

12. The method of claim 10, wherein the step of applying an alignment layer comprises solvent casting said alignment layer onto said substrate.

13. The method of claim 10, wherein the step of applying a thin film of a polymerizable liquid crystal material comprises solvent casting said thin film of a polymerizable liquid crystal material onto said alignment layer.

14. The method of claim 10, wherein said thin film of polymerizable liquid crystal material has a nematic phase, an alignment-layer interface that provides a substantially pretilt liquid crystal orientation angle, and an air interface, such that the step of adjusting the temperature of said thin film of polymerizable liquid crystal material is performed to achieve a liquid crystal pretilt angle at the air interface that is substantially the same as the liquid crystal pretilt angle at said alignment-layer interface.

15. The method of claim 14, wherein said thin film of polymerizable liquid crystal material has a liquid crystal pretilt angle of approximately 25 degrees to approximately 65 degrees.

16. The method of claim 10, wherein at least some of said bulky side-chain groups incorporate between 12 and 18 saturated carbon atoms.

17. The method of claim 10, wherein at least some of said bulky side-chain groups incorporate trifluoromethylphenyl groups.

18. An O-plate compensator for a liquid crystal display, said O-plate compensator manufactured in accordance with the method of claim 1.

19. A liquid crystal display for viewing at various angles with respect to a normal axis perpendicular to the display, comprising:

a polarizer layer;

an analyzer layer;

a liquid crystal layer disposed between the polarizer layer and the analyzer layer;

a first electrode proximate to a first major surface of the liquid crystal layer;

a second electrode proximate to a second major surface of the liquid crystal layer, the first and second electrodes being adapted to apply a voltage across the liquid crystal layer when the electrodes are connected to a source of electrical potential; and a positively birefringent O-plate compensator layer, disposed between the polarizer layer and the analyzer layer, that includes:

an alignment layer, said alignment layer comprising a thin film of a polymer material incorporating a plurality of bulky side-chain groups, and a positively birefringent layer comprising a thin film of a polymerized liquid crystal material adjacent said alignment layer, said positively birefringent layer having an optical symmetry axis, said optical symmetry axis being tilted at an angle of between approximately 25 degrees and approximately 65 degrees with respect to a surface of the liquid crystal polymer layer.

20. A positively birefringent O-plate compensator comprising:

an alignment layer comprising a thin film of a polymer material and incorporating a plurality of bulky side-chain groups; and a positively birefringent layer comprising a mixture of a polymerized liquid crystal material and a bulky side-chain liquid crystal polymer, said positively birefringent layer having an optical symmetry axis, said optical symmetry axis being tilted at an angle of between approximately 25 degrees and approximately 65 degrees with respect to a surface of the liquid crystal polymer layer.

21. The positively birefringent O-plate compensator of claim 20, wherein said bulky side-chain liquid crystal polymer is a polyacrylate.

22. A positively birefringent O-plate compensator comprising:

an alignment layer comprising a thin film of a polymer material; and a positively birefringent layer comprising a mixture of a polymerized liquid crystal material and a bulky side-chain liquid crystal polymer, said positively birefringent layer having an optical symmetry axis, said optical symmetry axis being tilted at an angle of between approximately 25 degrees and approximately 65 degrees with respect to a surface of the liquid crystal polymer layer.

\* \* \* \* \*